United States Patent
Baier Saip et al.

(10) Patent No.: US 7,827,411 B2
(45) Date of Patent: Nov. 2, 2010

(54) METHOD, SYSTEM, AND END USER DEVICE FOR IDENTIFYING A SENDER IN A NETWORK

(75) Inventors: Herbert Alexander Baier Saip, Winterhausen (DE); Marius Heuler, Würzburg (DE)

(73) Assignee: Infosim Networking Solutions AG, Wurzburg (DE)

( * ) Notice: Subject to any disclaimer, the term of this patent is extended or adjusted under 35 U.S.C. 154(b) by 1404 days.

(21) Appl. No.: 10/472,647

(22) PCT Filed: Mar. 22, 2001

(86) PCT No.: PCT/EP01/03264

§ 371 (c)(1), (2), (4) Date: Mar. 25, 2004

(87) PCT Pub. No.: WO02/078288

PCT Pub. Date: Oct. 3, 2002

(65) Prior Publication Data

US 2004/0153668 A1    Aug. 5, 2004

(51) Int. Cl.
H04L 9/00 (2006.01)
G06F 21/00 (2006.01)
(52) U.S. Cl. .......................... 713/184; 380/258; 726/5
(58) Field of Classification Search ............. 713/183, 713/182, 184, 170, 168; 726/4, 5, 9, 27
See application file for complete search history.

(56) References Cited

U.S. PATENT DOCUMENTS

| 5,754,657 | A | * | 5/1998 | Schipper et al. | 380/258 |
| 5,757,916 | A | * | 5/1998 | MacDoran et al. | 380/258 |
| 5,903,721 | A | | 5/1999 | Sixtus | |
| 6,104,815 | A | * | 8/2000 | Alcorn et al. | 380/251 |
| 7,231,044 | B2 | * | 6/2007 | Dube | 380/258 |

FOREIGN PATENT DOCUMENTS

| EP | 0 768 595 A | 4/1997 |
| EP | 0 829 991 A | 3/1998 |

OTHER PUBLICATIONS

International Search Report—PCT/EP01/03264; ISA/EP, Date of Mailing: Dec. 14, 2001.

* cited by examiner

*Primary Examiner*—Gilberto Barron, Jr.
*Assistant Examiner*—Izunna Okeke
(74) *Attorney, Agent, or Firm*—Harness, Dickey & Pierce, P.L.C.

(57) ABSTRACT

The present invention provides for an identification of a sender in a network, wherein first time-dependent data is generated at a sender on the basis of a first time. At least the first time-dependent data is communicated by the sender via a network to a receiver, which, in response to receiving the first time-dependent data, generates second time-dependent data on the basis of a second time. In order to verify the identity of the sender, the first and second time-dependent data are compared to determine a correspondence. Such a correspondence indicates that the sender is authorized to perform data communications with the receiver, i.e. indicates a successful verification of the identity of the sender.

26 Claims, 2 Drawing Sheets

METHOD, SYSTEM, AND END USER DEVICE FOR IDENTIFYING A SENDER IN A NETWORK

FIELD OF THE INVENTION

Figure 1:
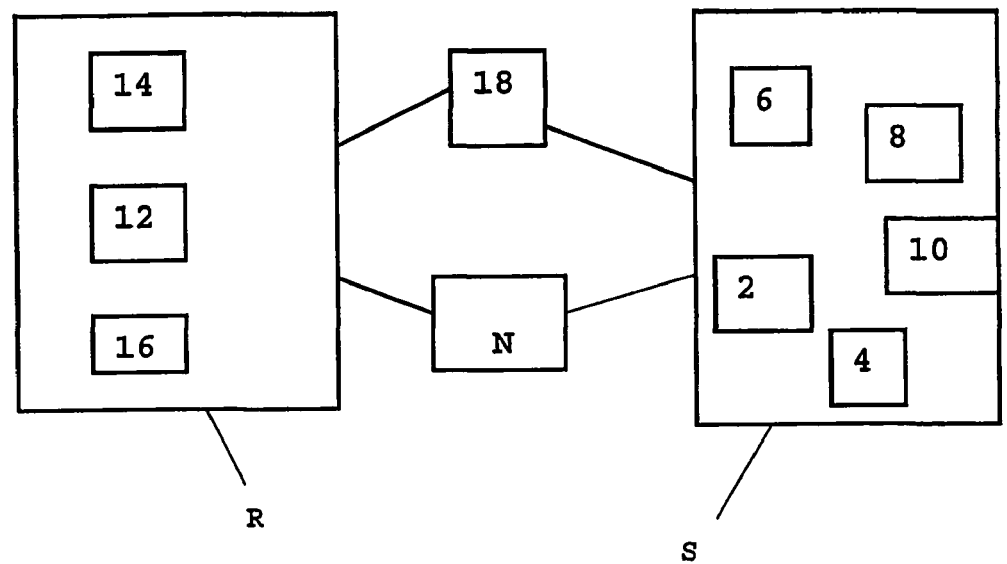

The present invention relates to a method for identifying a sender in a network by communicating sender data to a receiver which verifies the identity of the sender on the basis of the sender data. In particular, the present invention is related to a method wherein the sender data used for identifying the same includes time-dependent data and the verification of the identity of the sender is accomplished by comparing the time-dependent sender data and time-dependent data which are generated at the receiver on the basis of a time being essentially synchronized with the time underlying the time-dependent sender data or is correlated thereto in a pre-defined manner. Further, the present invention is related to a system for carrying out the method for identifying a sender in a network and an end user device for implementing at least parts of the method for identifying a sender in a network.

BACKGROUND OF THE INVENTION

Data communications between a sender and a receiver via a network are common. Examples for such data communications include any kind of data exchange between computer devices/systems, electronic devices/systems, end user devices (e.g. telephones, pagers, radio/broadcast devices), etc., via computer networks (e.g. the Internet, local area networks, intranets), radio/broadcast/satellite networks, fixed/mobile telephone networks, etc., and/or combinations thereof.

Since such data communications are required to be secure, for example in data communications related to cellular phones, online banking, online trading, exchange of information in B2B and B2C business, etc., it is desired to verify the identity of data communicating parties. In particular, it is desired to verify, in a secure manner, the identity of a party contacting a different party via a network for data transmission, communication, and/or access purposes.

For an identification of a sender it is known to communicate a password associated to the sender via a network to a receiver. Examples for such passwords include PIN numbers, TAN numbers, code/passwords individually pre-defined for the sender, and the like. The password received by the receiver is verified by the receiver in order to determine the identity of the sender. In case the identity of the sender is successfully verified, data communications between the sender and the verifying receiver and/or a further receiver are permitted. For example, the sender is allowed to access data of a receiver, to transmit confidential/critical information, perform online banking/trading, etc. Also, the verification can be accomplished with a respect to a receiver, to allow for data communications from the receiver to a sender, and bi-directional communications between the sender and the receiver.

It is known that networks for such data communications or at least parts thereof are not secure, i.e. not authorized sender can access data being transmitted. Such an interception by a third party makes it possible to wiretap a process of an authentication (verification of identities) of data communicating parties (sender/receiver), to detect data (e.g. user name, password, etc.) used for a verification of at least one of the data communicating parties, and to re-use the intercepted identification data in order to identify themselves in an unauthorized manner as one of the data communicating parties. As a result, the un-authorized third party is enabled to e.g. access data, perform online banking/trading, etc. which the third party is not allowed to do.

OBJECT OF THE INVENTION

The object of the present invention is to provide an improved solution for a secure identification of parties communicating data via a network which hinders an un-authorized third party to identify itself as one of the authorized data communicating parties even if the third party had gained access to data used by the authorized data communicating parties for identifying at least one thereof.

SUMMARY OF THE INVENTION

According to the invention, this object is achieved by a method for identifying sender in a network, wherein first time-dependent data is generated at/by a sender on the basis of a first time. At least the first time-dependent data is communicated by the sender via a network to a receiver, which, in response to receiving the first time-dependent data, generates second time-dependent data on the basis of a second time. In order to verify the identity of the sender, the first and second time-dependent data are compared at/by the receiver.

Further, it is possible to generate first time-independent data at/by the sender. Then, the first time-independent data are communicated to the receiver which, in response thereto, compares the first time-independent data with second time-independent data provided the receiver to verify the identity of the sender.

Moreover, it is contemplated to generate third time-dependent data at or by the sender on the basis of a third time and to communicate the same to the receiver. Upon receiving the third time-dependent data, the receiver generates fourth time-dependent data on the basis of a fourth time and compares the third and forth time-dependent data to verify the identity of a user.

As a further measure to improve the identification of the sender, first geographic location data can be generated at/by the sender, the first geographic location data indicating a geographic location of the sender, e.g. on the basis of a global positioning system (GPS). Then, in response to the first geographic location data communicated to the receiver, the receiver compares the first geographic location data and second geographic location data provided to the receiver to verify the identity the sender.

For identifying the sender, it is possible to verify the identity of the sender of the basis of a result of at least one of the above comparing steps.

In particular, the comparing of data communicated by the sender and data of the receiver successfully identifies the sender and indicates that the sender is authorized, respectively, in case at least one of the data pairs of the first/second time-dependent data and third/fourth time-dependent data is identical or exhibits a pre-defined relation.

An improved sender identification can be obtained when a successful sender identification requires that at least one of the data pairs of the first/second time-independent data and first/second geographic location data is required to be identical or to exhibit a pre-defined relation.

The utilization of pre-defined relations of data to be compared allows to consider effects due to data transmissions between the sender and the receiver, e.g. data transmission delays. In dependence of such effects to be considered, the pre-defined relations can be defined for each data pair to be compared and/or commonly for all data pairs.

In case the comparison has resulted in a successful identification of the sender, a data communication link may be established or maintained between the sender and the receiver and/or a further receiver. Here it is possible to establish the data communication link via the network over which the above data have been communicated to the receiver and/or via a further network to the identifying receiver and/or the further receiver.

For the comparison of the first and second time-dependent data, it is preferred that the underlying first time indicating a time a transmission is sent from the sender corresponds to underlying second time indicating the time the transmission was received by the receiver. Similarly, for the comparison of the third and fourth time dependent data, it is preferred that the underlying third time indicating a time a transmission is sent from the sender corresponds to the underlying fourth time indicating a time the transmission was received by the receiver.

For providing corresponding times for the sender and the receiver, the times between the same can be synchronised. This can be accomplished by means of data provided by a global positioning system, a radio/broadcast time signal, a clock rate, preferable a clock rate being common for the sender and the receiver, or combinations thereof. A utilization of a clock rate may be feasible for a sender and a receiver communicating via small networks, local area networks, intranets, and geographically restricted networks, while the other synchronization means may be advantages for remotely located sender and receivers, global networks, the Internet, and the like.

For the comparison of the time-dependent data it may be necessary to compensate for time delays due to communication delays for from the sender to the receiver. For example, due to data communication delays, the second time utilized for the generation of the second time dependent data may differ compared to the first time underlying the first time dependent data. In order to obtain sender times and receiver times which essentially correspond, it is preferred to consider time delays for the generation of the second time dependent data. For example, such time delays can be considered by means of time slots which are used instead of real time. Additionally or optionally, data communication time delays can be compensated in case the time delay for data communications between the sender and the receiver is actually known or can be estimated.

With respect to the first and the third time-dependent data of the sender it is possible to compensate for time delays relating to one of these time-dependent data, since the respective time-dependent data of the receiver for the other one of these time-dependent sender data can be properly obtained on the basis of the time-dependent receiver data for the time-dependent sender data for which a time delay compensation has been accomplished.

In order to avoid that a third party having intercepted sender data will utilize the sender data to identify itself in an un-authorized manner, it is possible to define a time period wherein sender data have to be received by the receiver for identifying the sender. For example, the time period can be define on the basis of a pre-defined number of the above time slots.

While the time-dependent receiver data are generated by the receiver upon receiving respective sender data, the time-independent receiver data, i.e. the second time-independent data, and/or the second geographic location data, i.e. the geographic location data of the receiver, can be provided by means of a memory device associated to the receiver.

A higher security level can be obtained by coding the sender data or at least parts thereof prior to the communication to the receiver. Then, for identifying the sender the receiver decodes the coded sender data or the coded parts thereof. For example, for the coding of the sender data a private key associated to the sender can be utilized, while for the decoding a public key for the sender and the receiver may be employed.

For the identification of the sender is preferred that the time-dependent receiver data are generated in the same manner as the respective time-dependent sender data. For example, the time-dependent data can be generated by considering the respective time-independent data and/or respective geographic location data, or data being representative thereof.

Utilizing the first and third time-dependent data of the sender, it is contemplated that the first time is indicative of the time of the generation of the sender data or at least parts thereof, while the third time is indicative of the time of the communication of sender data to the receiver, or vice versa.

While the time-dependent sender data can be associated to a specific end user device, the time-independent sender data can be associated to the specific end user device or a user thereof. Associating the time-independent sender data to a user allows for an identification of the user in case the user utilizes different end user devices. The same applies for the first geographic location data being associated to a user of an end user device, while it is also contemplated to associate the geographic location sender data to a specific end user device.

A further enhanced identification security can be obtained if the above mentioned communication link between the sender and the receiver is established for only one user with the same name.

Assuming the receiver comprises more than one receiving units (e.g. gateway routers, servers, etc.), an improper identification of the sender can be avoided if the sender is allowed to communicate data only once or only with one of the receiving units at the same time.

Moreover, the data communication link can be only established for the first end user device contacting the receiver if more than one end user device provides data identifying the same user, e.g. an IP (internet protocol) address of the user.

Further, the present invention provides a system for identifying a sender in a network, the system comprising a sender and a receiver communicating via a network, wherein the sender and the receiver are adapted to carry out the above described method according to the invention or an embodiment thereof.

Senders for the system according to the invention include fixed/portable personal computers, computer based system/devices (e.g. palmtops, hand held organizers), fixed mobile telephones, radio/television/broadcast systems/devices, network servers, network routers, gateway routers, and users thereof, while suitable networks are contemplated to include network types as set forth in the beginning of the description. The receiver can be one of the types of apparatus used as sender, and can further include components for an authentification of the sender and/or the user thereof, such as an authentification router and an authentification server.

Moreover, the present invention provide an end user device which is adapted to carryout steps of the method according to the invention described with respect to the sender. Thus, the end user device according to the invention includes the apparatus types described in relation to the sender of the system according to the invention, and in particular portable electronic devices such as mobile telephones.

SHORT DESCRIPTION OF THE FIGURES

In the following, preferred embodiments of the invention are described with respect to the accompanying FIGS. 1 to 3, which illustrate embodiments of to the invention.

DESCRIPTION OF PREFERRED EMBODIMENTS

Figure 2:
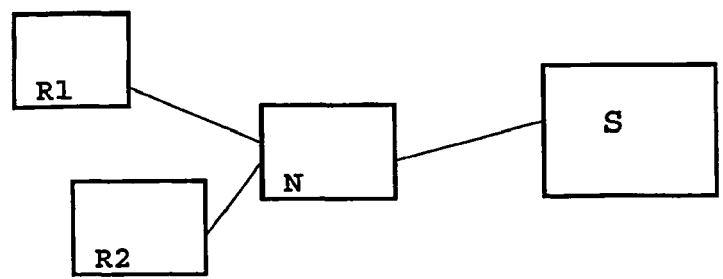

FIG. 1 shows a sender S and a receiver R connected via a network N.

The sender S includes a central processing unit 2 for controlling the operation of the sender S, a memory 4, a clock means 6, an optional GPS (global positioning system) means 8 to be operated with a global positioning system (not shown), and an optional key means 10.

The memory 4 can include fixed, time-independent data, such as a user name, an identification of the sender S, a respective Internet Protocol (IP) address, TAN and/or PIN numbers, or combinations thereof, which can be used to generate a password for the sender S. Such time-independent identifying data or parts thereof can also be provided via the key means 10 which includes chip cards, smart cards, software, etc.

The optional GPS means 8 provide information being indicative of a geographical location of the sender S on the basis of a respective communication with a global positioning system (not shown). Respective geographic location data are transmitted from the GPS means 8 to the central processing unit 2, which can use the same for the generation of a password for the sender S.

For the generation of a time-dependent part of the password for the sender S, the clock means 6 supply time signals or respective data.

The receiver R includes a central processing unit 12 and clock means 14. A memory 16 of the receiver R includes data being indicative of the fixed, time-independent identification data of the sender S.

Synchronisation means 18 are provided for synchronizing the clock means 6 and 14. For a synchronization of the clock means 6 and 14, the synchronization means 18 can be provided by the above mentioned global positioning system by means of respective time signals, by radio/broadcast time signals, or by a clock rate. The communication of time synchronizing signals from the synchronization means 18 to the clock means 6 and 14 can be performed by wireless communication links, by fixed wire communication links, for example via the network N, or combinations thereof.

In the following, a method for identifying a sender in a network is described with respect to FIG. 1.

The sender S desires to establish a data communication link to the receiver R for e.g. accessing data of the receiver R, transmitting data of its own, and/or exchanging data with the receiver R. In order to ensure that only authorized senders are allowed to establish such a data communication link, the sender S generates a password. The password of the sender S includes a fixed, time-invariant password part and a time-variant password part. The sender S generates the time-invariant password part on the basis of data of the memory 4 and/or data provided by the key means 10, or obtains the same from the memory 4 and/or the key means 10.

Utilizing signals from the clock means 6, the central processing unit 2 generates the time-dependent password part. In particular, the time-dependent password part includes information identifying the actual time provided by the clock means 6.

Additionally, the password of the sender S can include geographic location data for the sender S which are generated by the central processing unit 2 on the basis of respective information provided by the GPS means 8.

The resulting password for the sender S can be coded, for example on the basis of a private key for the sender S, in order to improve the data communication security. The (coded) password of the sender S is communicated via the network N to the receiver R.

Upon the reception of the password of the sender S, the receiver R generates data to check the received sender password for verifying the identity of the sender S. Such data, which are called password check data in the following, include a fixed, time-independent part, a time-dependent part, and, optionally a part indicating a geographic location. The fixed, time-independent part of the password check data is obtained from the memory 16, or generated on the basis of data of the memory 16. The (optional) geographic location data part of the password check data can be obtained from the memory 16, or generated on the basis of data of the memory 16, assuming the sender S is at a fixed geographic location. In case the sender S is allowed to be positioned at different geographic locations, the geographic location data part of the password check data of the receiver R can be obtained from the above mentioned global positioning system, or generated on the basis of information indicative of the geographic location of the sender S by the global positioning system.

Comparable to the generation of the time-dependent part of the password of the sender S, the receiver R generates the time-dependent part of the password check data on the basis of time signals provided by the clock means 14. Since the clock means 6 and 14 are synchronized by the synchronization means 18, for the generation of the time-dependent part of the password check data, time delays due to the data transmission from the sender S to the receiver R have to be considered. For that purpose, it is possible to measure the actual time delay for the communication of the password of the sender S, to estimate the same, or to employ time slots, which will be explained with reference to FIG. 3.

For the verification of the identity of the sender S, the receiver R compares its password check data with the password of the sender S. In particular, the receiver R compares the time-independent password check data part with the time-independent password part of the sender S, the time-dependent password check data part with the time-dependent part of the password of the sender S, and, optionally, the geographic location data part of the password check data with the geographic location data of the password of the sender S.

In case the password check data of the receiver R and the password of the sender S, and, in particular, the respective parts thereof, are identical, the verification of the identification of the sender S is successful. As a result, the sender S is allowed to further communicate data with the receiver R. If the verification of the identity of the sender S fails, the communication link previously used for the communication of the sender password is aborted. Then, it is possible that the receiver R logs this attempt by the sender S and initiates measures to provide any unauthorized accesses by the sender S.

If, for example, the generation of the sender password is complex and/or further data are to be communicated together with the sender password, the central processing unit 2 of the sender S can generate a further time-dependent part for the sender password utilizing information of the clock means 6. In such a case, it is possible that the above described first time-independent part of the sender password indicates the actual time of the beginning of the attempt to access the receiver R (e.g. start of password generation), while the further second time-dependent part of the sender password indicates the actual time of the communication of the sender password and the optional data to the receiver.

Upon receiving the sender password including both time-dependent parts, the receiver R generates, beside the above described parts of its password check data, a further time-dependent part. The further time-dependent part of the password check data is compared, like the other parts of the password check data, with the respective part of the sender password, i.e. its further time-dependent part.

In case the sender password is coded before a communication to the receiver R, the central processing unit 12 of the receiver R decodes the received data, for example by means of a public key associated to the sender S and the receiver R.

The above described method for identifying a sender in a network, can be also employed to allow for data communications of sender with a receiver being different from a receiver verifying the identity of the sender. Referring to FIG. 2, a sender S wants to establish a communication link to a receiver R1 via a network N. In order to ensure that only authorized senders are allowed to establish a communication link with the receiver R1, the sender S communicates a password, which can be generated as described above with respect to FIG. 1, to a receiver R2. The receiver R2 serves as means for a verification of the identity of the sender S comparable to the receiver R of FIG. 1. In case the verification of the identity of the sender S is successful, the identifying receiver R2 informs the receiver R1 that the sender S is authorized to communicate data via the network N with the receiver R1.

Figure 3:
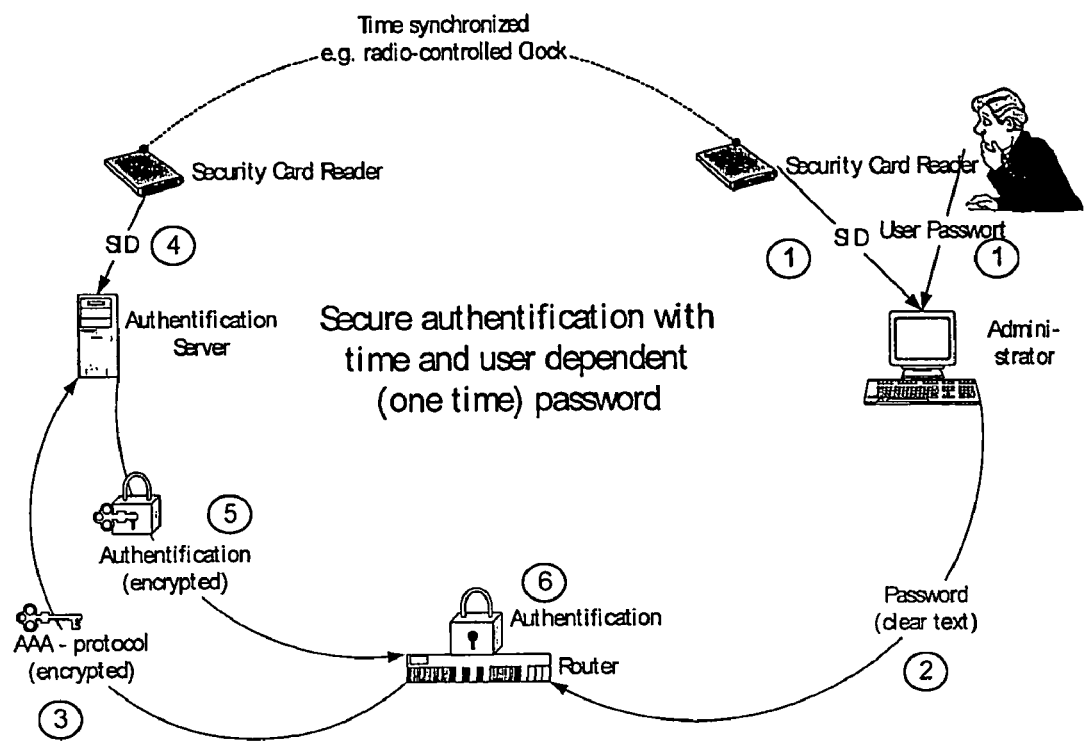

Referring to FIG. 3, a further embodiment of the method for identifying a sender in a network is explained. In order to get access to a system (not shown), a user generates a password. The system on the user side uses a fixed, time-independent part and a time-dependent part to generates a password. The fixed password part, for example the name of the user, his/her IP (Internet protocol) address, TAN number, and/or PIN number, can be provided on the user side by means of a security card (not shown) inserted into a security card reader. The time-dependent part of the password is an expression based on the actual time. In this time-dependent password part, the recent time could be coded to synchronize the system on the user side with the system the user wants to contact. Both the time-independent part and the time-dependent part are used to generate the user password which can be further coded. The generation of the password and the coding thereof can be accomplished by a network appliance, a computer system, a chip card, or a cellular phone.

In this embodiment, the password and the name of the user are transmitted over an un-secure communication channel.

The system the user wants to contact receives the transmitted password and the user name by means of an authentification system S1. the authentification system S1 passes the received password and the user name to an authentification server S2 which can be included by the system, or can be a remote authentification server system because e.g. of performance issues or scalability. An example for such an separated authentification server is an automated teller machine (ATM), which connects to a mainframe system for authentification. Advantageously, the data communication link between the authentification system S1 and the authentification server S2 should be a secured connection.

The authentification server S2 identifies the fixed, time-independent part of the password and the optional user name. Data corresponding to the time-independent password part and the user name are provided the authentification server S2 e.g. by means storing this data in a memory device associated to the authentification server S2, or by a security card (not shown) operated with a security card reader of the authentification server S2.

As explained above, the system on the user side and the authentification server S2 can be synchronized by means of a radio controlled clock, GPS signals, and the like. On the basis of the synchronized time between the system on the user side and the authentification server S2, the authentification server S2 itself generates a time-dependent part. In order to compensate transmission delays between the system on the user side and the authentification server S2, time slots are used instead of the real time. Such time slots can be configurable, for example in dependence of transmission delay from the system on the user side to the authentification system S1 and/or the authentification server S2. Assuming a time slot of 15 seconds is defined for a predefined start value, for example 14:30:10, and the user tries to access the desired system by logging in at 14:30:12, the time-dependent part of the password is generated with a time value of 14:30:10, but not with a time value of 14:30:12.

Using a algorithm like the system on the user side, the authentification server S2 generates on the basis of its provided time-independent password part and its generated time-dependent part a password. Then, the authentification system S1 compares the user password and the password generated by the authentification server S2. If both passwords are identical, the authentification server S2 can allow an access of the user to the system or employ additional rules to clarify the right to access the system. Such additional rules include:

Only one user with the same name is allowed to access the system.

If more than one authentification system S1 is connected to the authentification server S2, the user can access the system only once, or only on one of the authentification systems S1 at the same time.

In case more than one system on the user side is associated with the same Internet Protocol address of the user, only the user side system which logs in at first is allowed to access the system.

Only passwords of the user received during the last two time slots are used.

A geographical location coded in the password (e.g. a global positioning system signal) is used as an further identification characteristic.

Identification rules comparable to access control lists (ACL) for firewalls are employed.

If the compared passwords are identical and, in case additional rules are employed, respective once are fulfilled, the user is allowed to access the system. If the passwords are not identical and/or employed rules are not fulfilled, the authentification system S1 terminates or aborts the data communication connection with the system on the user side. Advantageously, the system generates and stores data being indicative of this unauthorized attempt and initiates measures against the unauthorized user.

In particular, the authentification server S2 transfers the results of the comparison of the passwords and, optionally, data being indicative whether additional rules are fulfilled to the authentification system S1. Then, the authentification system S1 permits an access of the user or terminates the connection with the user and the system on the user side, respectively.

If a third party intrudes a data communication link between the system on the user side and the system to be contacted, by wiretapping the password and the user name communicated from the user and tries to use this information to get an access to the system, the authentification system S1 and the authentification server S2 could identify the trail from the third party to get a data communication link and terminate the same. An identification of such an un-authorized access can be obtained as follows:

Since it takes a certain time after wiretapping the password and the user name from the system on the user side for the intruding third party to start its attempt to access the system, the time-dependent password part generated by the authentification server S2 will not correspond with the time-dependent password part received from the third party if its access attempt is performed after a too long period of time. The period of time wherein received passwords and, in particular, time-dependent password parts are considered to be valid can be defined, for example, by respectively choosing the above time slots.

On the basis of additional identification rules, exemplary described above, the authentification system S1 and the server S2 can, for example, allow access for only one user with the same name, while further users with the same name and, in particular, with the same password which try to access the system are not to allowed to establish a communication link with the system.

For implementing the method for identifying a user in a network, every system can be used which employs one-way authorization, like TAN-based systems, or authorization systems based on passwords, e.g. mobile communication systems like cellular phones, online banking/trading, computer systems, and the like. For example, access to routers or computer systems via Telnet-connections which are insecure could be made secure by means of this method.

The invention claimed is:

1. A method for authorizing a sender in a network comprising:
generating, by said sender, first time-dependent data, said first time-dependent data indicating a time at which data is sent to a receiver,
generating, by said sender, first geographic location data at said sender, said first geographic location data indicating a geographic location where said sender is currently located;
generating a first password based on said first time-dependent data and said first geographic location data;
communicating said first password by said sender via the network to said receiver;
generating, by said receiver, second time-dependent data, said second time-dependent data indicating a time at which said data is received by said receiver from said sender;
retrieving from memory second geographic location data indicating a predetermined geographic location at which said receiver expects said sender to transmit from;
comparing, by said receiver, said first time-dependant data and second time-dependent data;
comparing, by said receiver, said first geographic location data and said second geographic location data; and
authorizing further communication from said sender to said receiver based on said comparisons.

2. The method according to claim 1, comprising:
communicating first time-independent data from said sender to said receiver; and
comparing said first time-independent data with second time-independent data provided by said receiver for verifying the identity of said sender.

3. The method according to claim 2, wherein said first time-independent data is generated at said sender.

4. The method according to claim 2, wherein said comparing of data communicated by said sender and data of said receiver successfully authorizes said sender in case at least one of the data pairs of said first and second time-independent data, and said first and second geographic location data is identical.

5. The method according to claim 2, wherein said comparing of data communicated by said sender and data of said receiver successfully authorizes said sender in case at least one of the data pairs of said first and second time-independent data, and said first and second geographic location data exhibits a pre-defined relation.

6. The method according to claim 5, wherein said pre-defined relations are defined such that effects due to data transmissions between said sender and said receiver are considered.

7. The method according to claim 1, comprising:
generating third time-dependent data at said sender on the basis of a third time;
communicating said third time-dependent data to said receiver;
generating fourth time-dependent data by said receiver upon receiving said third time-dependent data on the basis of a fourth time; and
comparing said third and fourth time-dependent data for verifying the identity of said sender.

8. The method according to claim 7, wherein said comparing of data communicated by said sender and data of said receiver successfully authorizes said sender in case at least one of the data pairs of said first and second time-dependent data, and said third and fourth time-dependent data is identical.

9. The method according to claim 7, wherein said comparing of data communicated by said sender and data of said receiver successfully identifies said sender in case at least one of the data pairs of said first and second time authorizes data, and said third and fourth time-dependent data exhibits a pre-defined relation.

10. The method according to claim 9, wherein said pre-defined relations are defined such that effects due to data transmissions between said sender and said receiver are considered.

11. The method according to claim 7 wherein said third and fourth times essentially correspond for said comparison of said third and fourth time-dependent data.

12. The method according to claim 11, wherein the times for said sender and said receiver are synchronized.

13. The method according to claim 7, wherein time slots are employed for the generation of at least one of the group of said first time-dependent data at said sender, said second time-dependent data at said receiver, said third time-dependent data at said sender and said fourth time-dependent data by said receiver, wherein any time within a time slot corresponds to a predetermined time within the time slot, such that any time within the time slot will have the same time-dependent data.

14. The method according to claim 1, wherein a data communication link used for said communicating of data from said sender is maintained in case the identity of said sender is successfully verified.

15. The method according to claim 1, wherein a data communication link is established between said sender and a further receiver via said network in case said sender is successfully authorized.

16. The method according to claim 15 wherein a data communication link is established between said sender and said further receiver via a further network in case said sender is successfully authorized.

17. The method according to claim 1 wherein said first and second times essentially correspond for said comparing of said first and second time-dependent data.

18. The method according to claim 1, wherein time slots are employed for the generation of said first time-dependent data at said sender.

19. The method according to claim 1, wherein time slots are employed for the generation of said second time-dependent data by said receiver.

20. The method according to claim 1, wherein a time period is defined to indicate received data communicated from said sender are considered to be valid for authentication of said sender.

21. The method according to claim 1, wherein at least parts of said data communicated from said sender to said receiver are coded at said sender, and un-coded upon reception by said receiver at said receiver.

22. A system for authorizing a sender in a network, comprising:
a sender;
a receiver; and
a network for data communications between said sender and said receiver;
wherein said sender generates first time-dependent data, said first time-dependent data indicating a time at which data is sent to a receiver, generates first geographic location data at said sender, said first geographic location data indicating a geographic location where said sender is currently located, generates a password based on said first time-dependent data and said first geographic location data, and communicates said password by said sender via the network to said receiver; and
wherein said receiver generates second time-dependent data, said second time-dependent data indicating a time at which said data is received by said receiver from said sender, retrieves from memory second geographic location data indicating a predetermined geographic location at which said receiver expects said sender to transmit from, compares said first time-dependant data with second time-dependent data and said first time-dependant data with second time-dependent data, and authorizes further communication from said sender based on said comparison.

23. The method of claim 1 further comprising:
generating a second password based on said second-time dependent data and said second geographic location data; and
comparing said first password with said second password to verify the identity of said sender, wherein said first password and said second password are generated using a same algorithm, such that said sender is authorized to communicate when said first password and said second password are identical.

24. A method for authorizing a sender in a network comprising:
generating first time-dependent data at a sender on the basis of a first time, said first time-dependent data indicating a time at which data is sent, and generating first time-independent data at said sender;
generating, by said sender, a password based on said first time-dependent data and said first time-independent data;
communicating said password by said sender via a network to the receiver;
generating second time-dependent data by said receiver upon receiving said first time-dependent data on the basis of a second time, said second time-dependent data indicating a time at which data is received, and retrieving second time-independent data;
comparing, by said receiver, said first time-dependant data with second time-dependent data and said first time-independent data with said second time-independent data; and
authorizing further communication between said sender and said receiver based on said comparisons.

25. The method according to claim 24 further comprising:
generating the password further based on first geographic location data from said sender; and
generating a second password based on second time dependant data, second time-independent data and geographic location data provided by said receiver for verifying the identity of said sender.

26. The method of claim 25 wherein said sender generates the first password using the same algorithm used to generate the second password, such that the identify of said sender is verified when said first password is identical to said second password.

* * * * *